United States Patent [19]

Dibowski et al.

[11] 4,441,720

[45] Apr. 10, 1984

[54] SEAL OF A MILL

[75] Inventors: Günter Dibowski, Essen; Helmut Grommes, Duisburg, both of Fed. Rep. of Germany

[73] Assignee: Deutsche Babcock Werke Aktiengesellschaft, Oberhausen, Fed. Rep. of Germany

[21] Appl. No.: 435,769

[22] Filed: Oct. 21, 1982

[30] Foreign Application Priority Data

Oct. 22, 1981 [DE] Fed. Rep. of Germany ....... 3141830

[51] Int. Cl.3 ............................................. F16J 15/40

[52] U.S. Cl. ......................................... 277/3; 277/15; 277/74

[58] Field of Search ................. 241/47, 38; 277/3, 15, 277/59, 70, 71, 72 R, 72 FM, 74, 75, 135

[56] References Cited

U.S. PATENT DOCUMENTS

| | | | |
|---|---|---|---|
| 4,920 | 1/1847 | Gendebien et al. | 241/47 X |
| 1,649,148 | 11/1927 | Blyth | 241/47 |
| 3,508,758 | 4/1970 | Strub | 277/15 |
| 3,909,012 | 9/1975 | Denis | 277/15 |
| 4,087,097 | 5/1978 | Bossens et al. | 277/3 |

FOREIGN PATENT DOCUMENTS

| | | | |
|---|---|---|---|
| 40348 | 8/1887 | Fed. Rep. of Germany | 241/47 |
| 856381 | 11/1952 | Fed. Rep. of Germany | 241/47 |
| 1196944 | 7/1965 | Fed. Rep. of Germany | 241/47 |
| 1107302 | 8/1955 | France | 241/47 |
| 348977 | 5/1931 | United Kingdom | 241/47 |

*Primary Examiner*—Robert S. Ward
*Attorney, Agent, or Firm*—Max Fogiel

[57] ABSTRACT

A sealing arrangement between rotating and stationary parts of grinding mills, particularly those operated at pressure above atmospheric. A barrier air chamber is connected through a gap with the interior space of the mill. The flow direction of barrier air to the chamber is directed downwardly within the gap. The barrier air has a pressure exceeding the pressure of carrier gas for preventing passage of the carrier gas together with coal dust toward the outside. The width of the gap is adjustable, and the flow direction of the barrier air may also be oblique downwards within the gap. The gap at the same time, may be formed by an obliquely extending guide portion.

4 Claims, 3 Drawing Figures

SEAL OF A MILL

BACKGROUND OF THE INVENTION

The invention concerns the seal between the rotating and the stationary parts of a mill which is flowed through by air, particularly at excess pressure, and provided with a barrier air chamber which is connected through a gap with the interior space of the mill.

Seals of that kind are for example used in cylindrical millstone mills between the bedstone and the mill housing (Aufbereitungs-Technik 1971, Volume 9, page 543). The gap is in this case so formed that the barrier air flows through the gap upwardly from below. Under unfavorable operating conditions, dust-charged air out of the interior of the mill can in that case penetrate into the barrier air chamber where the dust deposits.

SUMMARY OF THE INVENTION

The invention is based on the task of increasing the sealing effect of the initially named seal.

This problem is solved according to the invention thereby, that the flow direction of the barrier air is directed outwardly from above within the gap.

The barrier gas in this seal is guided in direction of the force of gravity acting on the dust grains suspended in the air. The effect exerted by the blowing-in of the barrier air on the dust grains is thus increased by the force of gravity acting in the direction of blowing.

The seal according to the invention can in advantageous manner be further improved thereby, that the gap is adjustable. Through this adjustment, the seal can be adapted to variations caused by temperature or wear. The gap can then be so adjusted that the quantity of the barrier air is reduced to the value which suffices for a sealing. Thereby, the proportion of infiltrated air in the milling circuit is reduced and the energy requirement of the barrier air blower is lowered.

Several examples of embodiment of the invention are illustrated in the drawing and more closely explained in the following.

DESCRIPTION OF THE PREFERRED EMBODIMENTS

Figure 1:
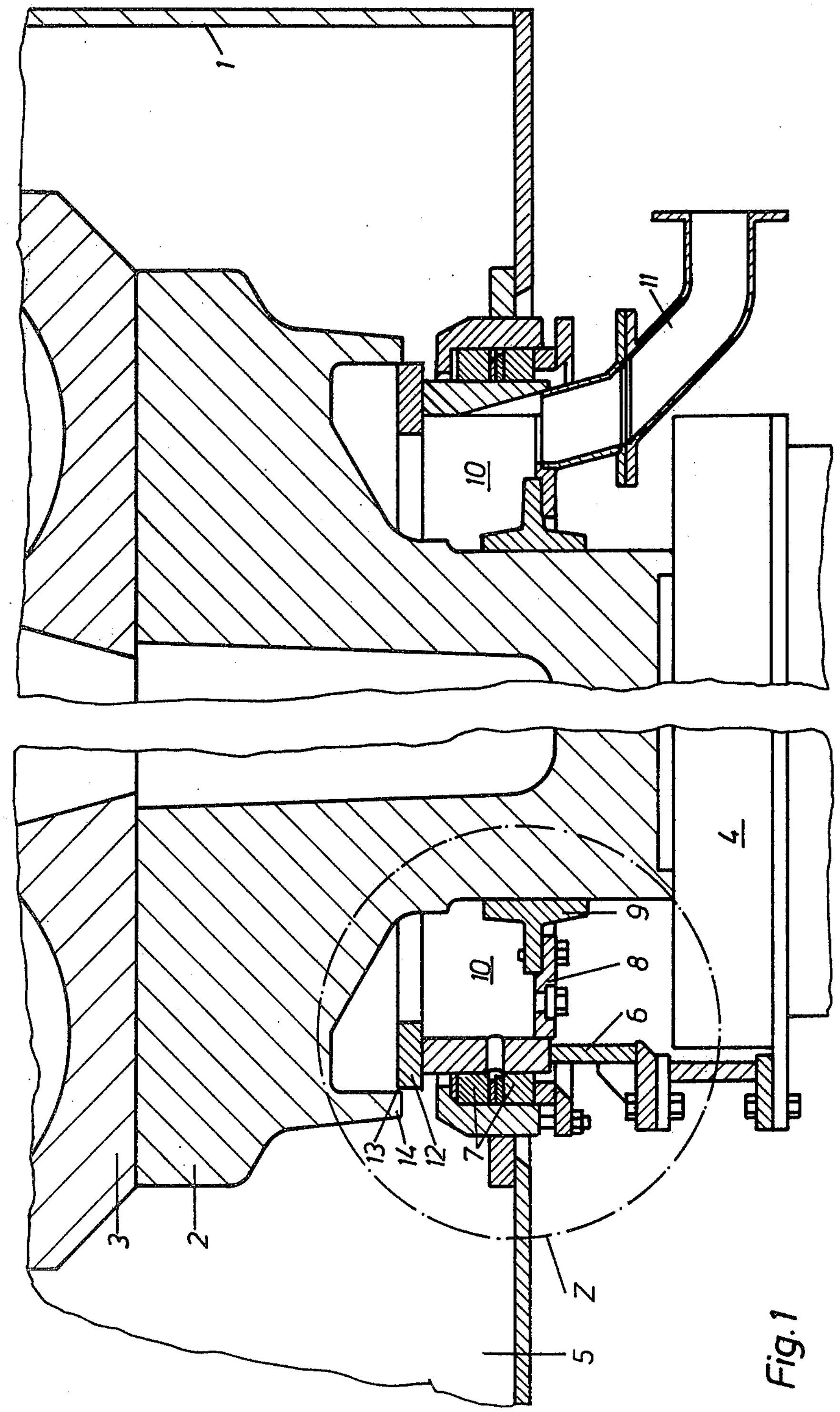
FIG. 1 shows the longitudinal section through the lower part of a cylindrical grindstone mill with a seal according to the invention.

The illustrated cylindrical grindstone mill displays a rotatable bedstone 2 within a mill housing 1. The bedstone 2 carries several millstone segments 3, on which not illustrated milling cylinders roll away. The bedstone 2 is driven by a motor and through a gear, of which only the output flange 4 of the gear is illustrated. The lower part of the mill housing 1, which surrounds the bedstone 2, is provided with a connection 5 for mill air, which serves as carrier gas for the mill stock.

The lower part of the bedstone 2 is conducted through the mill housing 1 and in that case sealed off relative to this in the manner described in the following.

A sealing ring carrier 6 is arranged on the gear centrally with respect to the bedstone 2. A seal 7 of a compressable material, for example of ceramic cord, is provided between the mill housing 1 and the sealing ring carrier 6.

A comb seal 9 is fastened to a plate 8 forming the bottom of the sealing ring carrier 6. This comb seal 9 encloses the lower part of the rotating bedstone 2 and contains metal rings, for example of brass, in several rows one above the other.

A barrier air chamber 10, which is provided with a barrier air connection 11, is formed between the stationary sealing ring carrier 6 and the rotating bedstone 2. Barrier air or another barrier gas at a higher pressure than prevails in the interior of the mill is fed through the barrier air connection 11 to the barrier air chamber 10.

The upper part of the sealing ring carrier 6 is constructed as ring 12, which under formation of a gap 13 stands at a small spacing opposite a flange 14 formed onto the bedstone 2. The barrier air penetrates through this gap 13 into the interior of the mill housing 1 and thus prevents a flowing-out of dust-charged air out of the mill housing in the region of the transition from the stationary to the rotating part of the mill.

The flange 14 of the bedstone 2 lies radially outside the ring 12 of the sealing ring carrier 6. In that case, the lower edge of the flange 14 engages over the upper edge of the ring 12. In this manner, the barrier air is forced to flow through the gap 13 downwardly from above.

Figure 2:
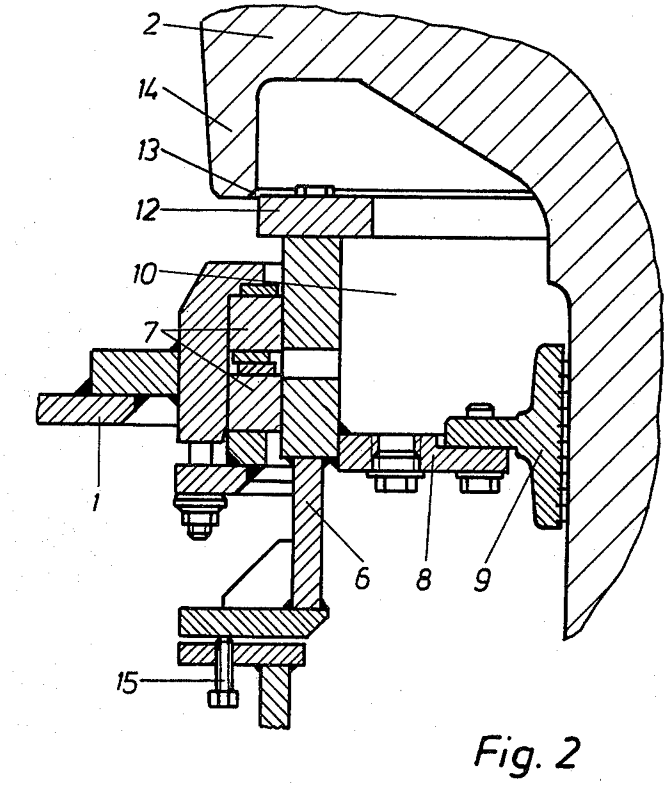
FIG. 2 shows the detail Z according to FIG. 1.
Figure 3:
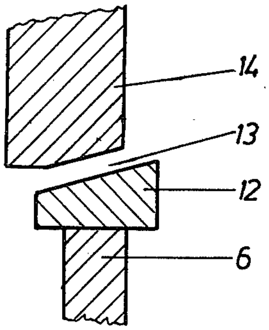
FIG. 3 shows another formation of the barrier air gap.

As is shown in FIG. 2, the mutually opposite edges of the flange 14 and of the ring 12 can be bevelled so that the barrier air flows obliquely downwards within the gap 13. According to FIG. 3, flange 14 and ring 12 are so constructed that the gap 13 consists of an obliquely extending guide portion.

For adaptation to variations caused in the region of the seal by temperature and wear, the width of the gap 13 is adjustable so that this can be set to the most favorable value. For this purpose, the sealing ring carrier 6 according to FIG. 2 rests on set screws 15, which are guided in a flange of the gear. Through a resetting of the set screws 15, the sealing ring carrier 6 can be raised or lowered relative to the bedstone 2. The spacing between the ring 12 of the sealing ring carrier 6 and the flange 14 of the bedstone 2 and thereby the width of the gap 13 changes with the height displacement of the sealing ring carrier 6.

The invention was described by the example of a cylinder grindstone mill. Beyond that, the invention lets itself be applied also to other mills, particularly such which are operated at excess pressure. Apart from the cylindrical millstone mill, the tubular mill comes into consideration as preferred field of application.

We claim:

1. Seal between rotating and stationary parts of a mill, particularly one operated at excess pressure and which is flowed through by air, comprising a barrier air chamber connected through a gap with interior space of the mill; barrier air fed to said chamber having a flow direction which is directed downwardly from above within the gap; said barrier air having a pressure exceeding the pressure of the carrier gas for passing through said gap and into the interior of the mill to prevent thereby passage of the carrier gas together with coal dust toward the outside, said barrier air comprising an amount substantially equivalent to the amount of carrier gas for preventing said barrier air passing through said gap to the mill interior from conveying any coal dust produced in the mill, said barrier air having a downward flow direction within said gap which is from above to below so that the barrier air flows in the direction in which gravity acts on dust particles suspended in the air, passage of the barrier having an effect on the dust particles which is increased by the force of gravity directed as the barrier air flow whereby the seal is substantially improved.

2. Seal according to claim 1, wherein the flow direction of the barrier air is directed obliquely within said gap.

3. Seal according to claim 2, wherein said gap is formed by an obliquely extending guide portion.

4. Seal according to claim 1, wherein the width of said gap is adjustable.

* * * * *